United States Patent
Walls (10) Patent No.: US 6,826,909 B2
(45) Date of Patent: Dec. 7, 2004

(54) HYDRAULIC GEROTOR MOTOR WITH INTEGRAL SHUTTLE VALVE

(75) Inventor: James L. Walls, Morristown, TN (US)

(73) Assignee: Parker-Hannifin Corp., Cleveland, OH (US)

( * ) Notice: Subject to any disclaimer, the term of this patent is extended or adjusted under 35 U.S.C. 154(b) by 104 days.

(21) Appl. No.: 10/290,706

(22) Filed: Nov. 8, 2002

(65) Prior Publication Data

US 2003/0101720 A1 Jun. 5, 2003

Related U.S. Application Data

(60) Provisional application No. 60/338,017, filed on Nov. 8, 2001.

(51) Int. Cl.[7] ............................................... F16D 31/02
(52) U.S. Cl. ........................................ 60/468; 418/61.3
(58) Field of Search ........................... 60/468; 418/61.3; 417/307, 310

(56) References Cited

U.S. PATENT DOCUMENTS

| | | | |
|---|---|---|---|
| 3,453,966 A | * 7/1969 | Eddy ........................ 418/61.3 |
| 3,616,882 A | * 11/1971 | White ....................... 418/61.3 |
| 4,271,725 A | 6/1981 | Takao et al. | |
| 4,343,601 A | * 8/1982 | Thorson .................... 418/61.3 |
| 4,545,748 A | 10/1985 | Middlekauff | |
| 4,557,109 A | 12/1985 | Nagahara et al. | |
| 4,563,136 A | 1/1986 | Gervais et al. | |
| 4,586,885 A | * 5/1986 | Middlekauff ............... 418/61.3 |
| 4,881,880 A | * 11/1989 | Dlugokecki ................ 418/61.3 |
| 5,062,776 A | 11/1991 | Dlugokecki | |
| 5,071,327 A | 12/1991 | Brewer ......................... 418/5 |
| 5,390,495 A | 2/1995 | Lemaire | |
| 5,531,071 A | 7/1996 | Asano | |
| 6,033,195 A | 3/2000 | Uppal | |
| 6,068,460 A | 5/2000 | Haarstad et al. | |
| 6,099,280 A | 8/2000 | Bernstrom et al. | |
| 6,132,194 A | 10/2000 | Wenker et al. | |
| 6,193,326 B1 | 2/2001 | Ybert | |
| 6,253,882 B1 | 7/2001 | White | |

OTHER PUBLICATIONS

Auxiliary valves VVA Shuttle valve. Catalog No. 9129 8602-06 (USA). Jan. 1998.

* cited by examiner

Primary Examiner—Thomas E. Lazo
(74) Attorney, Agent, or Firm—Renner, Otto, Boisselle & Sklar LLP (57) ABSTRACT

A hydraulic motor comprising a housing having inlet and outlet ports and an access port for connecting a pressure fluid to an accessory of the motor, such as a brake. A shuttle valve integrally contained within the housing selectively communicates the pressure at one of the inlet port or the outlet port to the access port. In addition, the housing has at least two axial sections that are sealed at a parting line therebetween, and the shuttle valve is inserted through an opening in one section so that when the sections are joined, the opening is sealed at the parting line. A ring of bolts holds the sections together, and the shuttle valve is contained at least partially within the envelope formed by the ring.

20 Claims, 6 Drawing Sheets

HYDRAULIC GEROTOR MOTOR WITH INTEGRAL SHUTTLE VALVE

This application claims the benefit of U.S. Provisional Application No. 60/338,017 filed on Nov. 8, 2001, which is hereby incorporated herein by reference in its entirety.

FIELD OF THE INVENTION

The present invention relates generally to a hydraulic motor and, more particularly, to a hydraulic motor with a gerotor drive assembly and integral shuttle valve useful with a brake assembly.

BACKGROUND OF THE INVENTION

A hydraulic motor can convert pressurized fluid flow into torque and speed for transferring rotational motion to a desired piece of machinery. A common type of hydraulic motor includes a gerotor set having an inner rotor "gear" received in an outer stator "gear." The stator has internal teeth or "vanes" extending radially inwardly and the rotor has one less external "tooth" or lobe extending radially outwardly. The rotor teeth remain in contact with the stator vanes as the rotor moves relative to the stator, and the resulting continuous multi-location contacts create fluid pockets that sequentially expand and contract as fluid is supplied and exhausted from the fluid pockets in a timed relationship.

As the pressurized fluid circulates through the fluid pockets, the pressurized fluid produces shaft rotation. Conversely, a gerotor set can be used in a pump such that shaft rotation can be used to produce fluid pressure, and thus a gerotor set can be used in a motor. A gerotor motor can provide a combination of compact size, low manufacturing cost, and high torque capacity thereby making it a popular choice for heavy duty applications requiring low speed (e.g., about 1000 rpm or less) and high torque (e.g., about 15,000 in-lb or more).

In the past, a variety of external valve components were connected to hydraulic motors for various purposes, either directly attached to the motor or connected remotely by hydraulic lines. These valve components have included shuttle valves. A common application is to connect a supply pressure to a brake normally biased to a braking condition for releasing the brake in conjunction with the supply of fluid power to the hydraulic motor. These valve component designs have been relatively heavy and bulky.

SUMMARY OF THE INVENTION

The present invention provides a hydraulic motor having an integral shuttle valve that, when compared to the conventional hydraulic motor and external valve arrangement, is lighter, uses fewer components, and is less bulky and more compact. Specifically, the present invention provides a hydraulic motor having a shuttle valve contained within the housing of the motor to provide pressure from the fluid circuit to an access port. Such a motor may be particularly useful with a brake, whereby the access port may provide a pressure in conjunction with the supply of hydraulic fluid to a motor to release a brake and allow the motor to rotate.

More particularly, the present invention provides a hydraulic motor having a housing, a chamber contained within the housing, and a drive assembly. The drive assembly includes a rotor located in the chamber and a drive shaft extending from the housing. The housing has inlet and outlet ports connected to a fluid circuit in the housing. The fluid circuit also is connected to an access port by a shuttle valve contained within the housing. The shuttle valve selectively transmits a relatively higher pressure from one of the inlet and outlet ports to the access port. Preferably, the shuttle valve is contained within the sealed diameter or region of the motor containing the fluid circuit.

The present invention also provides a hydraulic motor wherein the housing has at least two axial sections meeting at a parting line, and wherein the inlet and outlet ports open to an external face of the housing. In this embodiment, the shuttle valve is located in a passage in one of the axial sections, and the passage opens to the parting line between the sections of the housing so as to be internal to the housing when the sections of the housing are joined together.

The present invention further provides a hydraulic motor wherein the housing sections are held together by a peripheral arrangement of bolts. In this embodiment, the peripheral arrangement of bolts define a volume therebetween, and the shuttle valve is mounted at least partially within the volume defined by the peripheral arrangement of bolts. The bolts may be arranged in a circular fashion to define a cylindrical volume in which the shuttle valve is at least partly contained.

These and other features of the invention are fully described and particularly pointed out in the claims. The following description and drawings set forth in detail certain illustrative embodiments of the invention, these embodiments being indicative of but a few of the various ways in which the principles of the invention may be employed.

DETAILED DESCRIPTION

Figure 1:
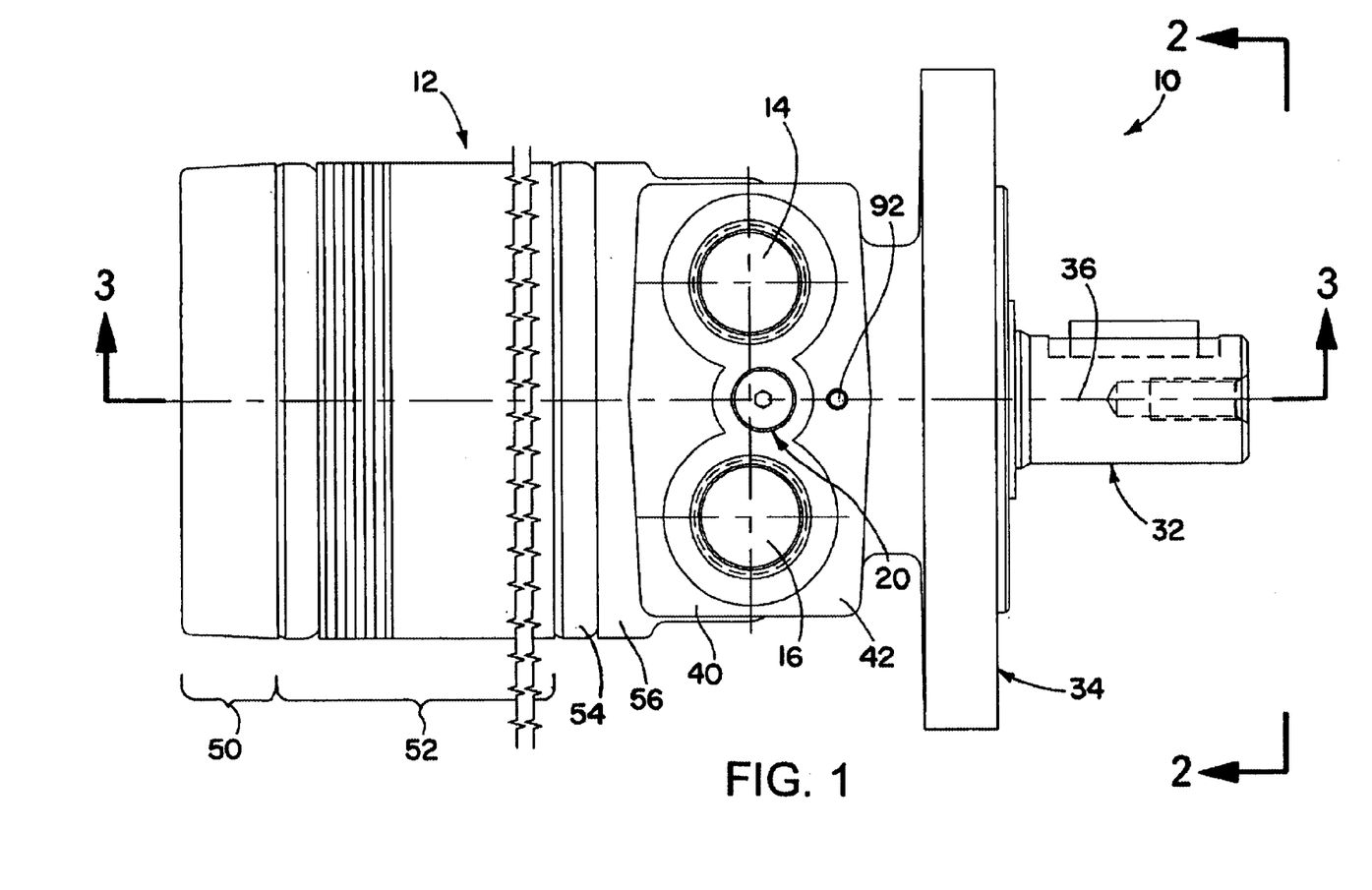
FIG. 1 is a side elevational view of a hydraulic motor in accordance with the present invention.
Figure 2:
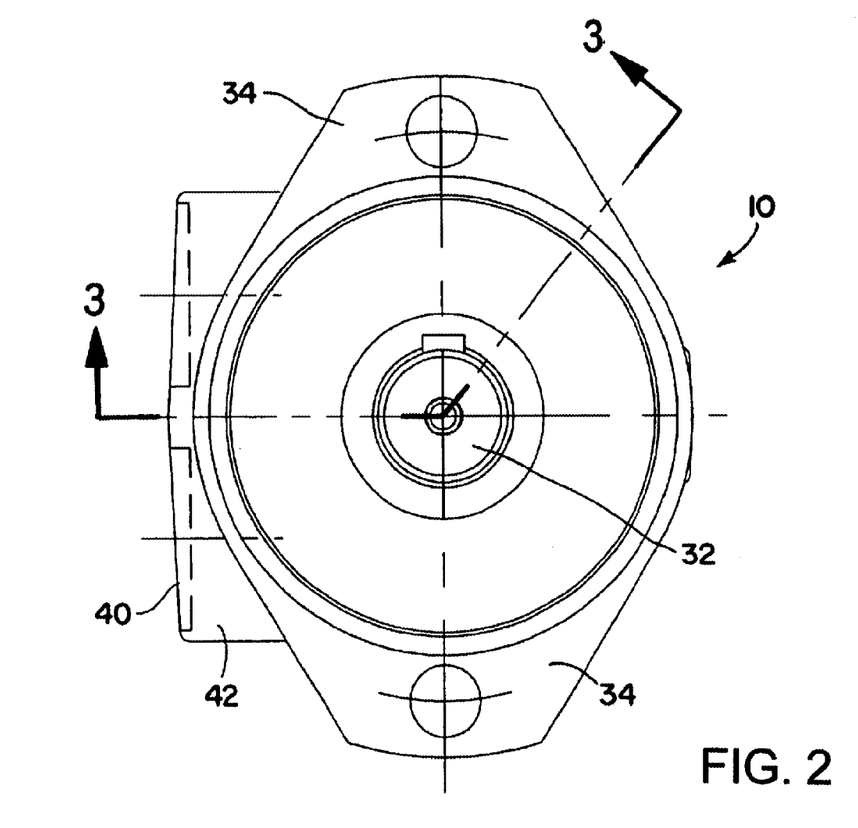
FIG. 2 is an end view of the motor looking from the line 2—2 of FIG. 1
Figure 3:
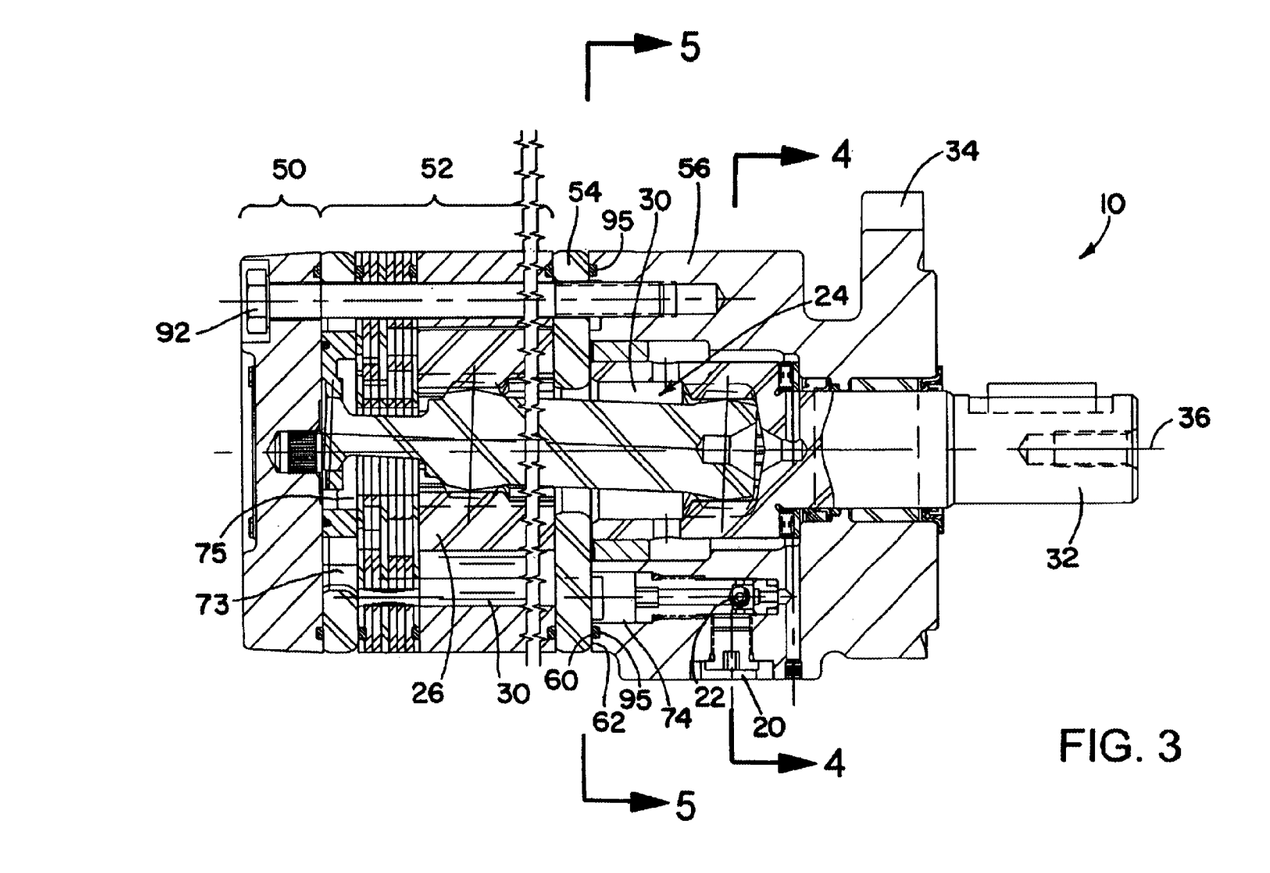
FIG. 3 is a cross-sectional view of the motor taken substantially along the line 3—3 of FIG. 2.

Referring now in detail to the drawings, and initially to FIGS. 1–3, an exemplary hydraulic motor according to the invention is designated generally by reference numeral 10. The exemplary motor is essentially identical to a Model TB0000AS260AAAA hydraulic motor available from Parker Hannifin Corporation of Cleveland, Ohio, except for the inclusion of the herein described shuttle valve and below-described modifications associated therewith.

The motor comprises a housing 12 having a pair of inlet/outlet ports 14 and 16, an access port 20, and an integral shuttle valve 22 for selectively transmitting a higher pressure from one of the inlet/outlet ports to the access port. (To facilitate the description, the inlet/outlet ports 14 and 16 will be referred to hereinafter collectively as "inlet/outlet ports" and individually as the "inlet port" 14 and the "outlet port" 16, although either port may be either an inlet or an outlet.) The pressurized fluid withdrawn or "bled" from the motor through the access port 20 may be used to control/power motor accessories, including the releasing of a brake (not shown) in conjunction with pressurized hydraulic fluid being fed into the motor.

The motor 10 further comprises a drive assembly 24 within the housing 12 that uses pressurized hydraulic fluid to generate rotational motion. The illustrated drive assembly includes a gerotor set with a rotor 26 located in a central chamber 30 of the housing. The rotation of the rotor generated by the pressurized hydraulic fluid is output via a rotatable drive shaft 32 extending from the housing.

The housing 12 of motor 10 may be substantially cylindrical as shown and may have a pair of mounting flanges 34 or other suitable mounting configuration. In addition, the inlet/outlet ports 14, 16 and the access port 20 may open to a substantially flat external face 40 of a port boss 42 protruding from one side of the housing. As shown, the inlet/outlet ports and the access port open in the same direction, a direction transverse to, and more specifically perpendicular to the longitudinal axis of the housing.

The housing 12 may be formed of a plurality of longitudinally aligned axial sections. The illustrated housing includes a rear section (end cover) 50, a drive assembly section (rotor set, manifold and commutator assembly) 52, a wear plate 54, and a forward section 56 (often referred to as a housing assembly in the art). Each section of the housing has an axial end face, and the sections are assembled so that respective end faces of adjacent sections abut one another along respective parting lines formed therebetween. For example, when assembled the wear plate 54 has a forward end face 60 that abuts a rear end face 62 of the forward section. The central chamber 30 in the housing referred to above extends through the drive assembly section, the wear plate and the forward section of the housing.

The housing 12 also contains a hydraulic fluid circuit. Hydraulic fluid generally may move through the fluid circuit from a high pressure zone at the inlet port 14, through the drive assembly 24, and to a relatively lower pressure zone at the outlet port 16 in a well-known manner (or in reverse manner if the port 16 is used as the inlet and the port 14 is used as the outlet). The access port is connected to the fluid circuit via a passage containing the shuttle valve 22. The particular arrangement of the shuttle valve and the access port provides significant advantages, as will be apparent from the following description.

Figure 4:
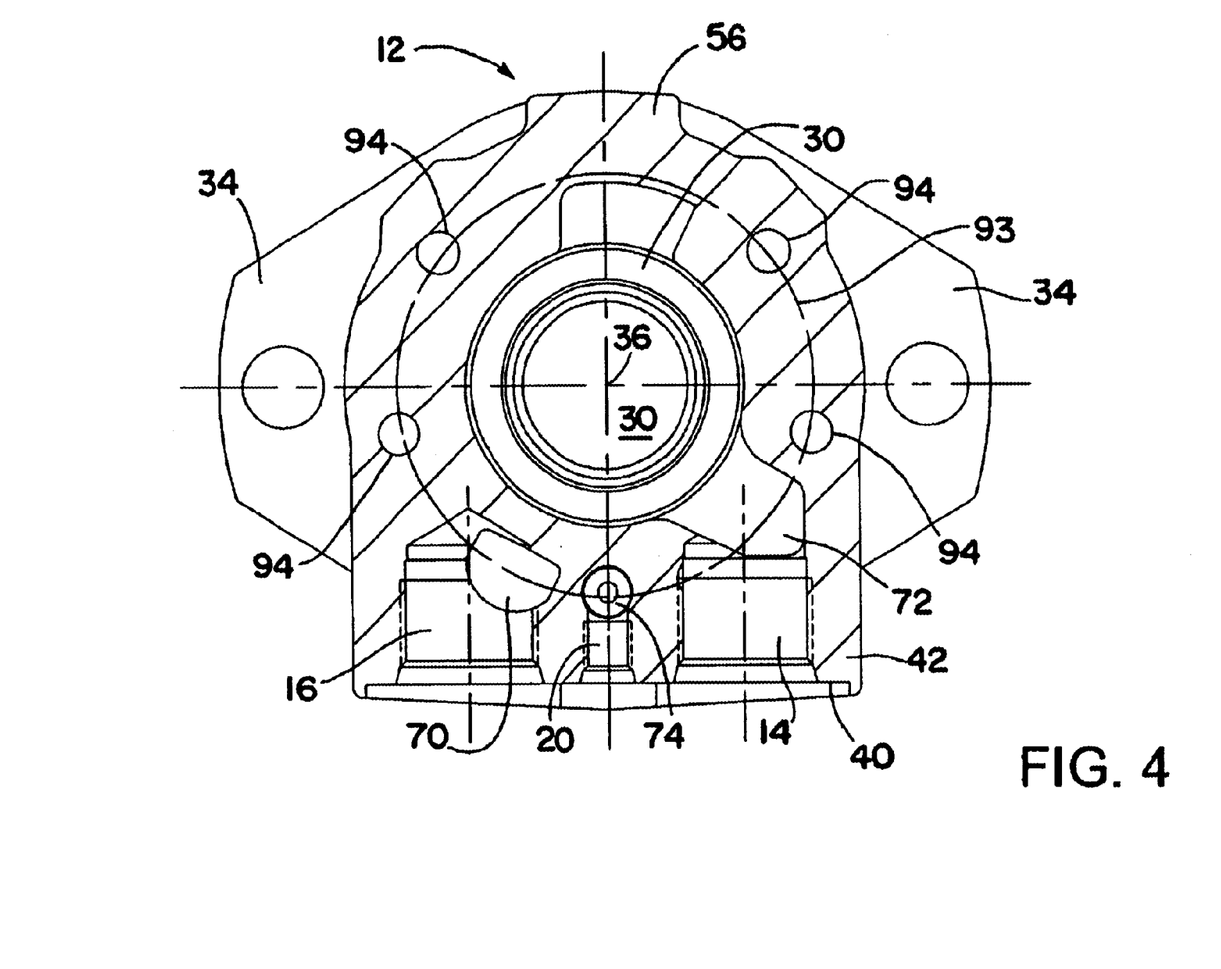
FIG. 4 is a cross-sectional view of the motor taken substantially along line 4—4 of FIG. 3.
Figure 5:
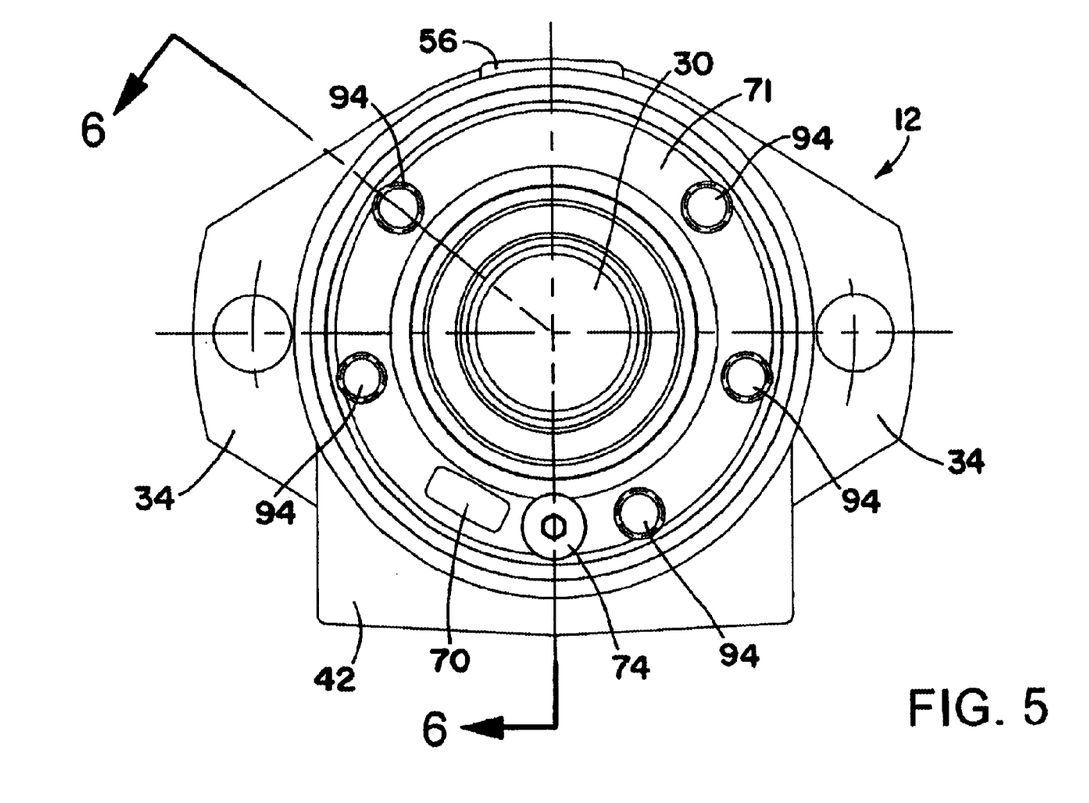
FIG. 5 is an end view of one housing section of the motor looking from the line 5—5 of FIG. 3 with the internal drive components removed for clarity.
Figure 6:
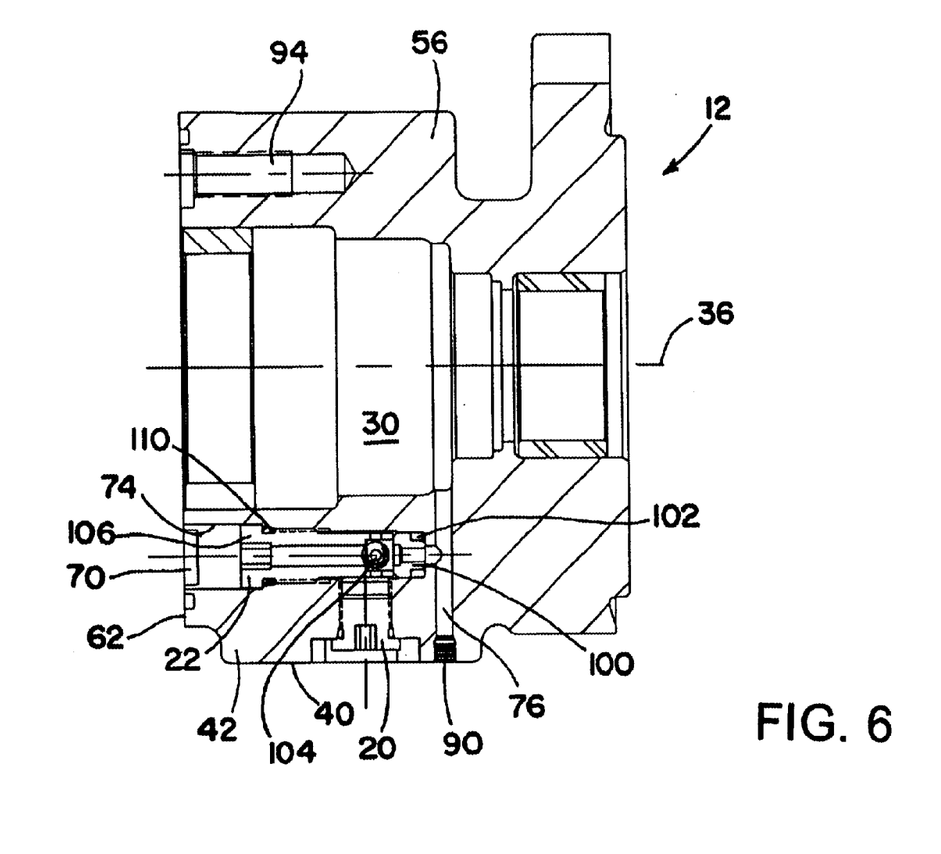
FIG. 6 is a cross-sectional view taken along the line 6—6 of FIG. 5.

As shown in FIGS. 4–6, the outlet port 16 may extend from the external face 40 of the port boss 42 to a first passage 70 which connects the outlet port 16 to an annular groove 71 (FIG. 5) in the face of the forward section 56. The annular groove 71 communicates with the ends of the axial holes for bolts 92 used to secure together the sections of the motor housing. The illustrated motor is of a "wet bolt" two zone design wherein the aligned bolt holes in the wear plate and drive assembly section are oversized to provide a passage for fluid flow between the annular groove 71 and a manifold 73 at the opposite end of the motor. It is noted, however, that the invention may be practiced with other types of hydraulic motors, the illustrated motor being an example of how the principles of the invention may be applied.

In the illustrated exemplary motor, a second passage 72 may connect the inlet port 14 with the central chamber 30 of the housing. The central chamber forms part of a first pressure zone wherein fluid flows between the inlet port 14 and a manifold 75 at the opposite end of the motor. The second pressure zone includes the annular groove 71, the bolt holes and the manifold 73.

A passage 74 located between the inlet/outlet ports 14 and 16 preferably extends from the rear end face 62 of the forward section 56 to a third passage 76. The third passage may extend from the external face of the port boss perpendicular to the axis of the housing to the central chamber. Together these latter two passages 74 and 76 allow the separate pressure zones of the motor 10 to connect. The third passage is plugged adjacent the external face of the port boss with an expansion plug 90. The access port 20 preferably extends perpendicular to the axis of the housing, parallel to and longitudinally aligned with the third passage, to connect with the axial passage 74. In the illustrated housing, the access port opens at a location midway between the inlet/outlet ports.

The shuttle valve 22 is located in the passage 74 and defines therewith two inlets and an outlet. The shuttle valve may be mounted in the axial passage such that the outlet of the shuttle valve is aligned with the access port 20. The inlets of the shuttle valve may be aligned with each other, with one inlet opening to the third passage 76 the other opening at the open end of the passage 74 which communicates with the annular passage 71.

In the illustrated embodiment, the shuttle valve 22 is at least partly contained with a volume defined by a peripheral arrangement of bolts 92 used to hold together the housing sections 50, 52, 54 and 56 (FIG. 2) and preferably completely contained within the sealed diameter of the motor. In the illustrated embodiment which is a "wet bolt" design as above-indicated, the bolts 92 and the holes therefor are circumferentially spaced apart and define a bolt circle within the sealed diameter that can be extended axially to define a volume in which the shuttle valve is preferably at least partly contained. More particularly, the passage for the shuttle valve can be formed on the bolt circle as shown. The sealed diameter or region of the motor in relation to the shuttle valve may be defined by a face seal 95 provided in an annular groove formed in the rear face of the forward section.

In the illustrated embodiment, the shuttle valve 22 has a pressed-in valve seat 100 with an O-ring seal 102, and a check ball 104. The shuttle valve also has a threaded shuttle plug 106, with a second o-ring seal 110, to capture and limit movement of the check ball. The illustrated shuttle valve may be obtained from the Gresen Hydraulics Division of the Parker-Hannifin Corporation. As should now be apparent, the shuttle valve transmits pressure from the highest of the two pressure zones to the access port 20. Clearly, the separate sections of the housing facilitate integration of the shuttle valve into the housing of the motor. In addition, because only a small amount of fluid is needed to transmit the pressure through the access port, the shuttle valve and associated passages can be small.

It should be noted that, while the illustrated motor 10 was designed for heavy duty applications requiring low speed and high torque, the principles of the invention can be employed in pumps and motors designed for other applications. In addition, although the description herein refers primarily to motors, most motors of the type described herein may also be used as pumps driven to pressurize a fluid rather than being driven by a pressurized fluid.

Although the invention has been shown and described with respect to a certain illustrated embodiment, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiment of the invention.

What is claimed is:

1. A hydraulic motor having a housing, a chamber contained within the housing, a drive assembly including a rotor located in the chamber and a drive shaft extending from the housing, the housing having at least two inlet/outlet ports connected to a fluid circuit in the housing, an access port connected to the fluid circuit via a shuttle valve in the housing that selectively transmits a pressure from one of the inlet/outlet ports to the access port, wherein a pressure difference between the inlet/outlet ports causes the shuttle valve to open a first passage to the access port from the inlet/outlet port with the higher pressure and to close a second passage to the access port from the inlet/outlet port with the lower pressure.

2. A hydraulic motor as set forth in claim 1, wherein the housing has a longitudinal axis, and the access port, the inlet port, and the outlet port opens in a common direction transverse to the longitudinal axis.

3. A hydraulic motor as set forth in claim 2, wherein the access port extends substantially perpendicularly to the longitudinal axis of the housing.

4. A hydraulic motor as set forth in claim 2, wherein the inlet and outlet ports extend substantially perpendicularly to the longitudinal axis of the housing.

5. A hydraulic motor as set forth in claim 1, wherein the access port opens at a location between the inlet and outlet ports.

6. A hydraulic motor as set forth in claim 1, wherein the access port, the inlet port and the outlet port open at an external face of the housing.

7. A hydraulic motor as set forth in claim 1, wherein the housing has at least two axial sections held together by a peripheral arrangement of bolts, the peripheral arrangement of bolts define a volume therebetween, and the shuttle valve is mounted at least partially within the volume defined by the peripheral arrangement of bolts.

8. A hydraulic motor as set forth in claim 7, wherein the bolts are arranged along a circle to define a cylindrical volume therebetween.

9. A hydraulic motor as set forth in claim 7, wherein the shuttle valve is disposed within a passage in one section of the housing.

10. A hydraulic motor as set forth in claim 9, wherein the passage is contained within the sealed region of the motor.

11. A hydraulic motor having a housing, a chamber contained within the housing, a drive assembly including a rotor located in the chamber and a drive shaft extending from the housing, the housing having at least two inlet/outlet ports connected to a fluid circuit in the housing, an access port connected to the fluid circuit via a shuttle valve in the housing that selectively transmits a pressure from one of the inlet/outlet ports to the access port, wherein the shuttle valve is located in a passage that is parallel to a longitudinal axis of the housing.

12. A hydraulic motor having a housing; a shuttle valve in the housing; a chamber contained within the housing; and a drive assembly including a rotor located in the chamber and a drive shaft extending from the housing; the housing having at least two axial sections meeting at a parting line, the housing having access, inlet and outlet ports opening to an external face of the housing, the inlet and outlet ports being connected to a fluid circuit contained in the housing, the fluid circuit being connected to the access port such that the shuttle valve selectively transmits a relatively higher pressure from one of the inlet and outlet ports to the access port, and the shuttle valve being located in a bore that opens to the parting line between the axial sections of the housing so as to be internal to the housing when the axial sections of the housing are joined together.

13. A hydraulic motor as set forth in claim 12, wherein the housing has a longitudinal axis, and the access port, the inlet port and the outlet port open in a same direction transverse to the longitudinal axis.

14. A hydraulic motor as set forth in claim 12, wherein the access port opens at a location between the inlet and outlet ports.

15. A hydraulic motor as set forth in claim 12, wherein the access port and inlet and outlet ports open to an external face of the housing.

16. A hydraulic motor as set forth in claim 12, wherein the passage is contained within a sealed diameter of the housing.

17. A hydraulic motor as set forth in claim 12, wherein the shuttle valve is located in a passage that is parallel to a longitudinal axis of the housing.

18. A hydraulic motor as set forth in claim 12, wherein the drive assembly includes a gerotor set.

19. A hydraulic motor having a housing; a chamber contained within the housing; a drive assembly including a rotor located in the chamber; and a drive shaft extending from the housing; the housing having an access port, at least two inlet/outlet ports respectively connected to first and second pressure zones of a fluid circuit in the housing, and a passage extending between the first and second pressure zones of the fluid circuit; and a valve disposed in the passage and movable by a difference in pressure between the first and second zones to connect the access port to the zone with the higher pressure and shut-off the access port from the zone with the lower pressure.

20. A hydraulic motor as set forth in claim 19 in combination with a brake operatively coupled to the drive shaft, wherein the access port is connected to the brake.

* * * * *

UNITED STATES PATENT AND TRADEMARK OFFICE
CERTIFICATE OF CORRECTION

PATENT NO. : 6,826,909 B2
DATED : December 7, 2004
INVENTOR(S) : James L. Walls

It is certified that error appears in the above-identified patent and that said Letters Patent is hereby corrected as shown below:

Column 5,
Line 16, replace "dose" with -- close --.

Signed and Sealed this

Fifteenth Day of March, 2005

JON W. DUDAS
*Director of the United States Patent and Trademark Office*